(12) United States Patent
Suzuki

(10) Patent No.: US 11,170,211 B2
(45) Date of Patent: Nov. 9, 2021

(54) INFORMATION PROCESSING APPARATUS FOR EXTRACTING PORTIONS FILLED WITH CHARACTERS FROM COMPLETED DOCUMENT WITHOUT USER INTERVENTION AND NON-TRANSITORY COMPUTER READABLE MEDIUM

(71) Applicant: FUJIFILM Business Innovation Corp., Tokyo (JP)

(72) Inventor: Tatsuya Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/547,595

(22) Filed: Aug. 22, 2019

(65) Prior Publication Data
US 2020/0304670 A1    Sep. 24, 2020

(30) Foreign Application Priority Data

Mar. 22, 2019   (JP) .............................. JP2019-054901

(51) Int. Cl.
*G06K 9/00*    (2006.01)
*H04N 1/00*    (2006.01)

(52) U.S. Cl.
CPC ..... *G06K 9/00463* (2013.01); *G06K 9/00442* (2013.01); *G06K 9/00449* (2013.01); *G06K 9/00456* (2013.01); *H04N 1/00803* (2013.01); *G06K 2209/01* (2013.01); *H04N 1/00806* (2013.01)

(58) Field of Classification Search
None
See application file for complete search history.

(56) References Cited

U.S. PATENT DOCUMENTS

| 6,363,394 | B1 * | 3/2002 | Rajarajan | G06F 16/284 |
| 9,536,141 | B2 * | 1/2017 | Saund | G06F 40/186 |
| 9,692,936 | B2 | 6/2017 | Shimamura | |
| 2007/0065011 | A1 * | 3/2007 | Schiehlen | G06K 9/033 382/181 |
| 2020/0050845 | A1 * | 2/2020 | Foncubierta Rodriguez | G06K 9/00456 |

FOREIGN PATENT DOCUMENTS

| JP | 2004240598 | 8/2004 |
| JP | 2016200967 | 12/2016 |

* cited by examiner

*Primary Examiner* — Barbara D Reinier
(74) *Attorney, Agent, or Firm* — JCIPRNET

(57) ABSTRACT

An information processing apparatus includes an acquirer and an updater. The acquirer acquires a template document image obtained as a result of reading a template document. The updater updates, based on the template document image, processing procedure information indicating a procedure of processing including an extracting step and another step to processing procedure information indicating a procedure of processing including the extracting step and a step whose content is updated. The processing is processing to be executed based on a completed document image obtained as a result of reading a completed document generated by filling characters into the template document. The extracting step is a step of extracting a region including a character image from the completed document image.

9 Claims, 14 Drawing Sheets

FIG. 5
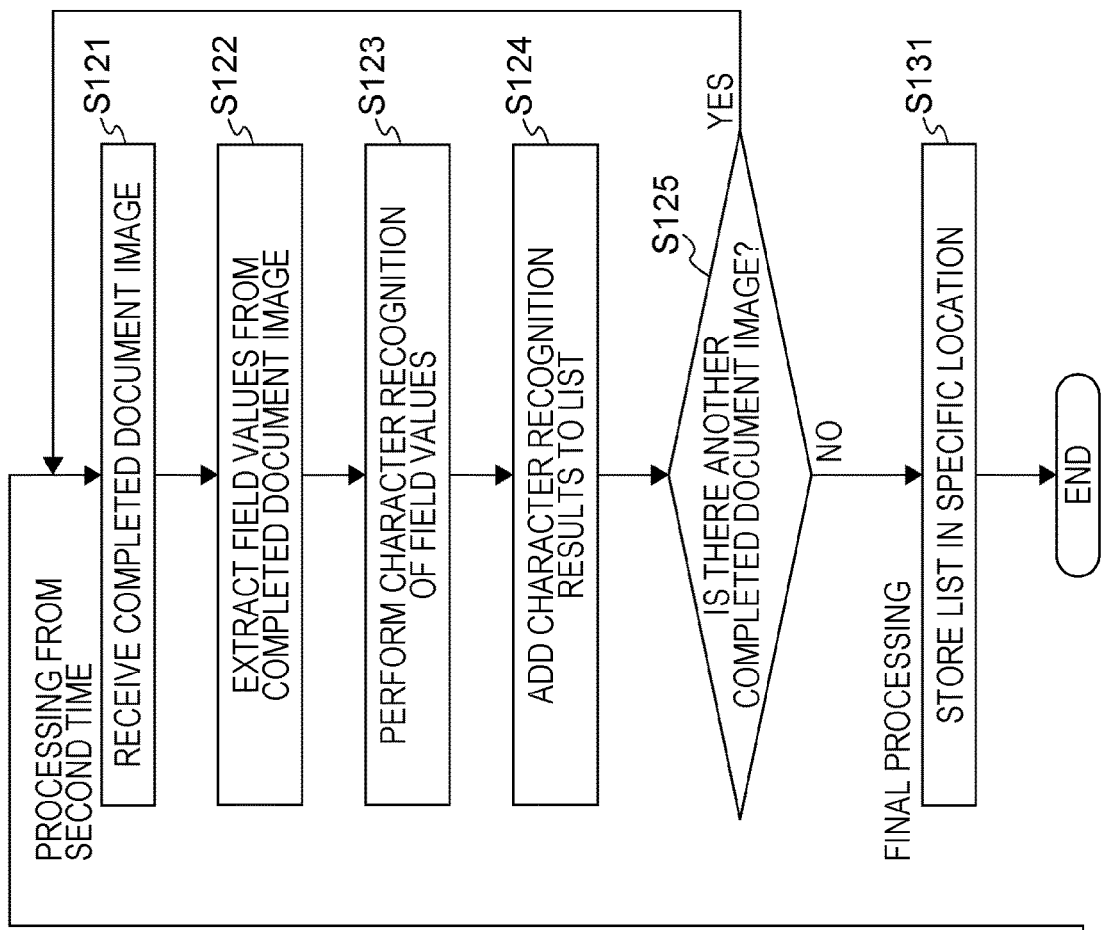
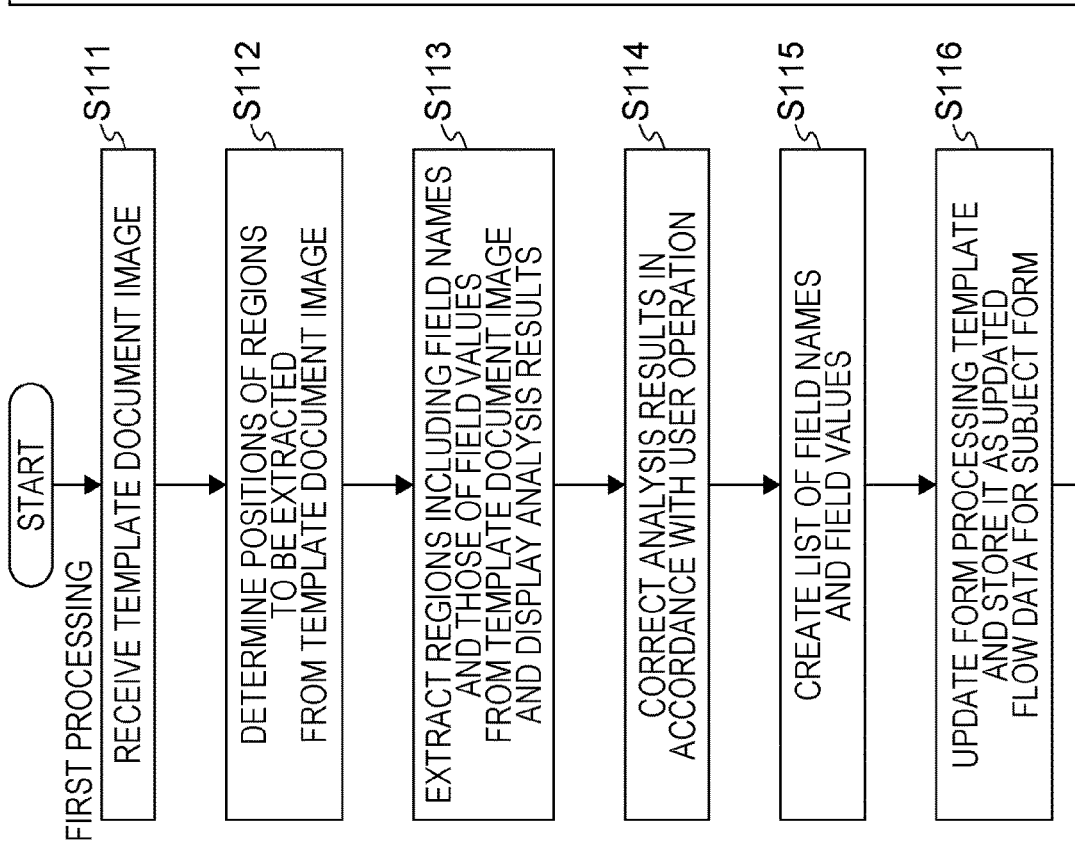

FIG. 7
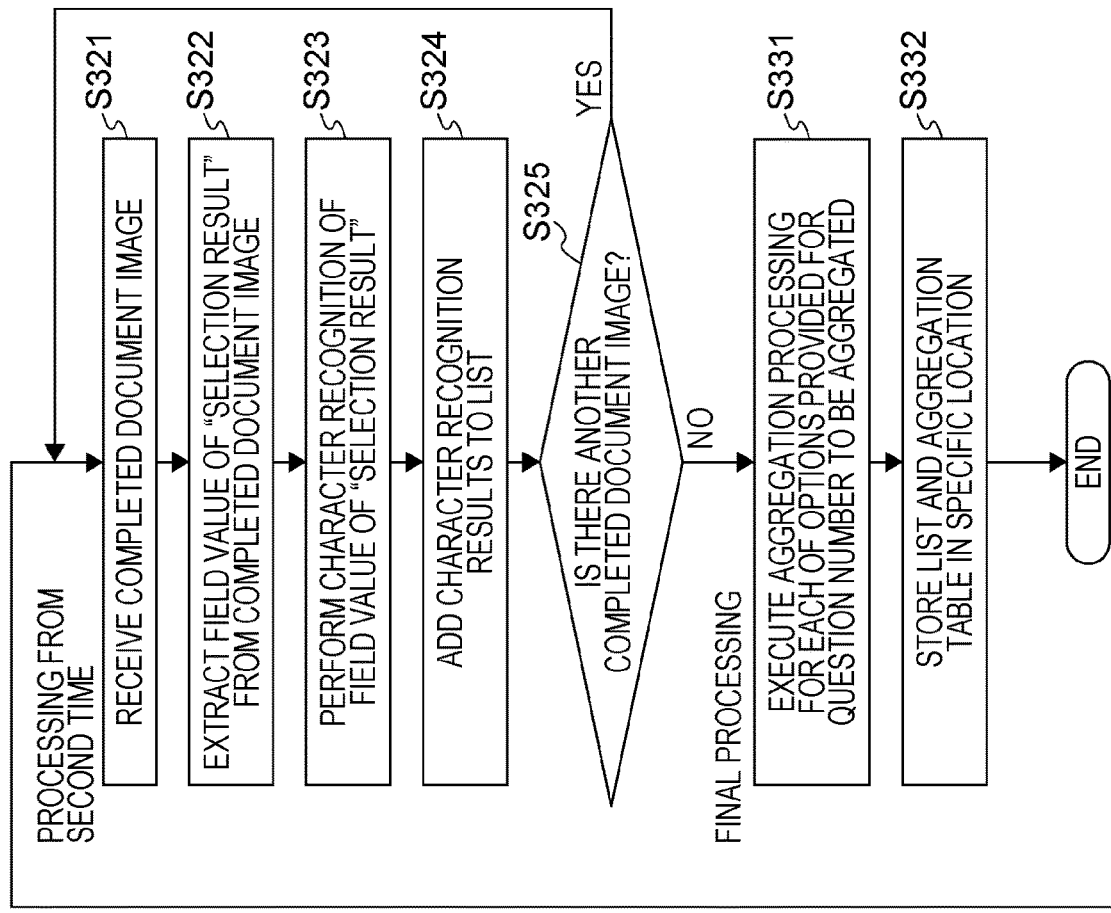
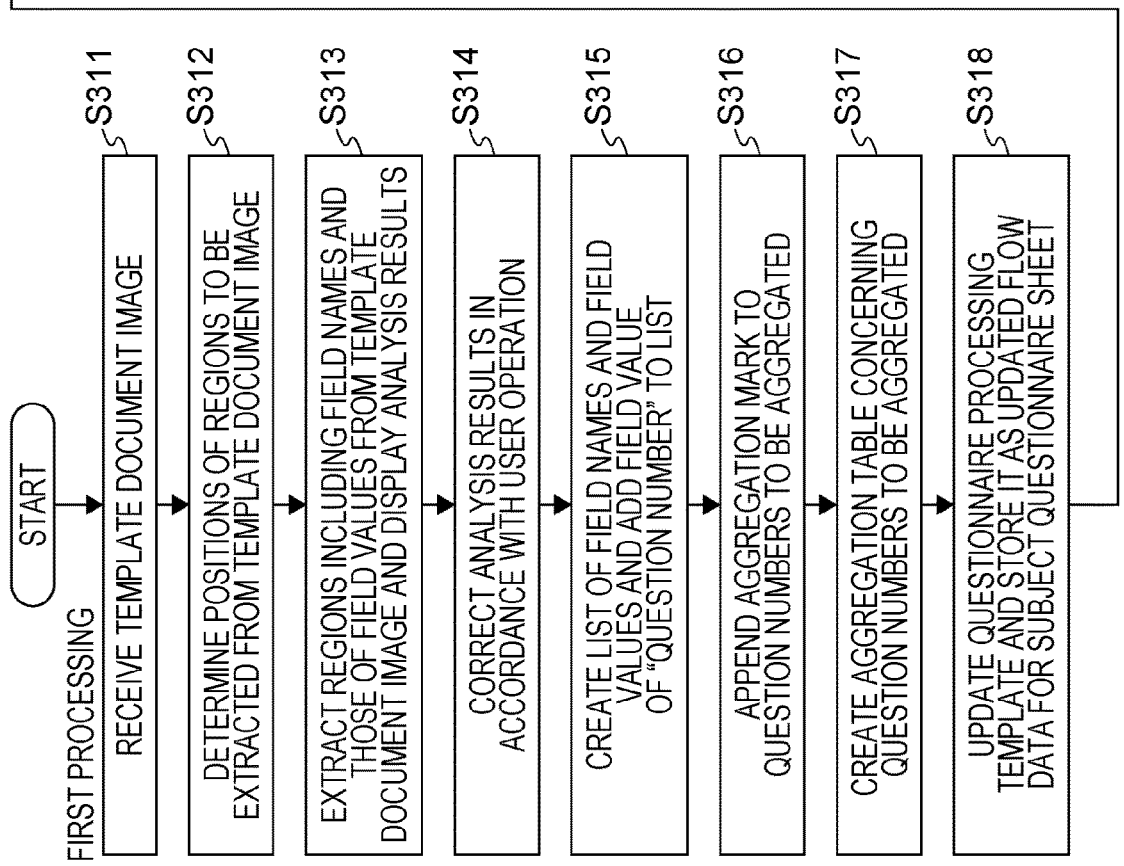

FIG. 10

XX Application form

Please fill in the blanks.
Your personal information is ...

Customer information

| 531a | Ruby characters | | 532a |
| 531b | Name | | 532b |
| 531c | Address | | 532c |
| 531d | Telephone number | | 532d |
| 531e | Fax number | | 532e |
| 531f | Email address | | 532f |
| 531g | Age | | 532h |
| | Gender (Male/Female) | | 531h, 532g |
| 531i | Comment and feedback | | 532i |

XX Application form

Please fill in the blanks.
Your personal information is ...

Customer information

| Ruby characters | |
|---|---|
| Name | |
| Address | |
| Telephone number | |
| Fax number | |
| Email address | |
| Age | |
| Gender | (Male/Female) |

Comment and feedback

Edit    OK

FIG. 15

XX Application form

Please fill in the blanks.
Your personal information is ....

Customer information

| Ruby characters | SUZUKI Tatsuya |
| --- | --- |
| Name | 鈴木達矢 |
| Address | XX-ku, Yokohama-shi, ... |
| Telephone number | 045-XXX-XXX |
| Fax number | |
| Email address | suzuki@xxx.xx.xx |
| Age | |
| Gender | (Male)/Female |

Comment and feedback

I would like to apply for ....

INFORMATION PROCESSING APPARATUS FOR EXTRACTING PORTIONS FILLED WITH CHARACTERS FROM COMPLETED DOCUMENT WITHOUT USER INTERVENTION AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-054901 filed Mar. 22, 2019.

BACKGROUND

(i) Technical Field

The present disclosure relates to an information processing apparatus and a non-transitory computer readable medium.

(ii) Related Art

The following data aggregation method is known (see Japanese Unexamined Patent Application Publication No. 2004-240598, for example). Answers described in a completed form by using annotations are separated from a digital document representing a question sheet, and the annotations appended to the answers are registered in an annotation database (DB) different from a document DB in which the question sheet is stored. Aggregation processing for the questions is executed based on the annotations appended to the answers, and the aggregation result is also registered in the annotation DB separately from registered documents in the document DB. The question sheet and the aggregation result are displayed such that they are superimposed on each other.

The following image processing device is also known (see Japanese Unexamined Patent Application Publication No. 2016-200967, for example). The image processing device includes a reader, a display controller, a receiver, and a specifier. The reader reads plural documents. The display controller performs control to display a first image corresponding to a first document among the documents read by the reader on a screen. The receiver receives a position, which is a start point of the region of the first image to be used for specifying the region. The specifier specifies a region of a second image corresponding to a second document read by the reader in accordance with the position of the start point of the region of the first image received by the receiver. The display controller performs control to display the region of the second image specified by the specifier, together with the first image.

SUMMARY

As a result of reading a completed document generated by filling characters into a template document, a completed document image is obtained. Typically, processing based on this completed document image includes various steps including an extracting step of extracting regions including character images from the completed document image. A technology for facilitating the extracting step in such processing by appending annotations describing regions to be extracted to the template document in advance and by extracting these regions from the completed document image is known.

Aspects of non-limiting embodiments of the present disclosure relate to an information processing apparatus and a non-transitory computer readable medium that are able to facilitate the entire processing based on a completed document image compared with a configuration in which only an extracting step of extracting a region including a character image from a completed document image is facilitated.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an acquirer and an updater. The acquirer acquires a template document image obtained as a result of reading a template document. The updater updates, based on the template document image, processing procedure information indicating a procedure of processing including an extracting step and another step to processing procedure information indicating a procedure of processing including the extracting step and a step whose content is updated. The processing is processing to be executed based on a completed document image obtained as a result of reading a completed document generated by filling characters into the template document. The extracting step is a step of extracting a region including a character image from the completed document image.

BRIEF DESCRIPTION OF THE DRAWINGS

An exemplary embodiment of the present disclosure will be described in detail based on the following figures, wherein:

FIG. 5 is a flowchart illustrating an example of the operation of the flow management device according to the exemplary embodiment when routine processing is form processing;

FIG. 7 is a flowchart illustrating an example of the operation of the flow management device according to the exemplary embodiment when routine processing is questionnaire processing;

FIG. 10 illustrates an example of an extraction result screen to be displayed when the positions of regions to be extracted are determined in the first processing in the exemplary embodiment;

FIG. 12 illustrates an example of a corrected extraction result screen to be displayed when the positions of regions to be extracted are corrected in the first processing in the exemplary embodiment;

FIG. 15 illustrates an example of an extraction result screen to be displayed when field values are extracted in processing executed from the second time in the exemplary embodiment.

DETAILED DESCRIPTION

An exemplary embodiment of the disclosure will be described below in detail with reference to the accompanying drawings.

Background and Overview of Exemplary Embodiment

Concerning processing based on a completed document generated by filling characters into a template document, a technology for extracting portions filled with characters from the completed document without user intervention is available. However, a step of extracting such portions is only part of processing, and the time required for the entire processing is not reduced.

In this exemplary embodiment, a step of extracting portions filled with characters from a completed document and the subsequent steps are treated as one processing flow, and processing covering a wider portion of the flow is executed without user intervention.

Examples of routine processing including such an extracting step are form processing, test marking processing, and questionnaire processing (aggregating of questionnaire results in most cases).

In form processing, questions and answers are extracted from images obtained by reading plural form sheets and are represented as a list.

In test marking processing, examinee information (such as the name and the number), test number, answer result (an answer with a check mark is assumed as a correct answer, and an answer without a check mark or with a cross mark is assumed as a wrong answer), and points are extracted from images obtained by reading plural marked answer sheets, and these elements are represented as a list.

Questionnaire processing is the same as form processing if responders of a questionnaire are allowed to write freely in a questionnaire sheet. If options are provided for a question of a questionnaire, questionnaire processing is processing for counting the number of responders for each option.

In this exemplary embodiment, templates for plural types of routine processing (such as form, test marking, and questionnaire) are prepared, and at the start of processing, a user is instructed to select one of these types of routine processing. When processing is executed for the first time (first processing), a template document is read, and an unfixed portion of an extracting step and that of a list creating step in a processing template are fixed to complete these steps. When processing is executed from the second time, the processing template in which the unfixed portions are fixed in the first processing is used as flow data dedicated to this document.

[Overall Configuration of Flow Management System]

Figure 1:
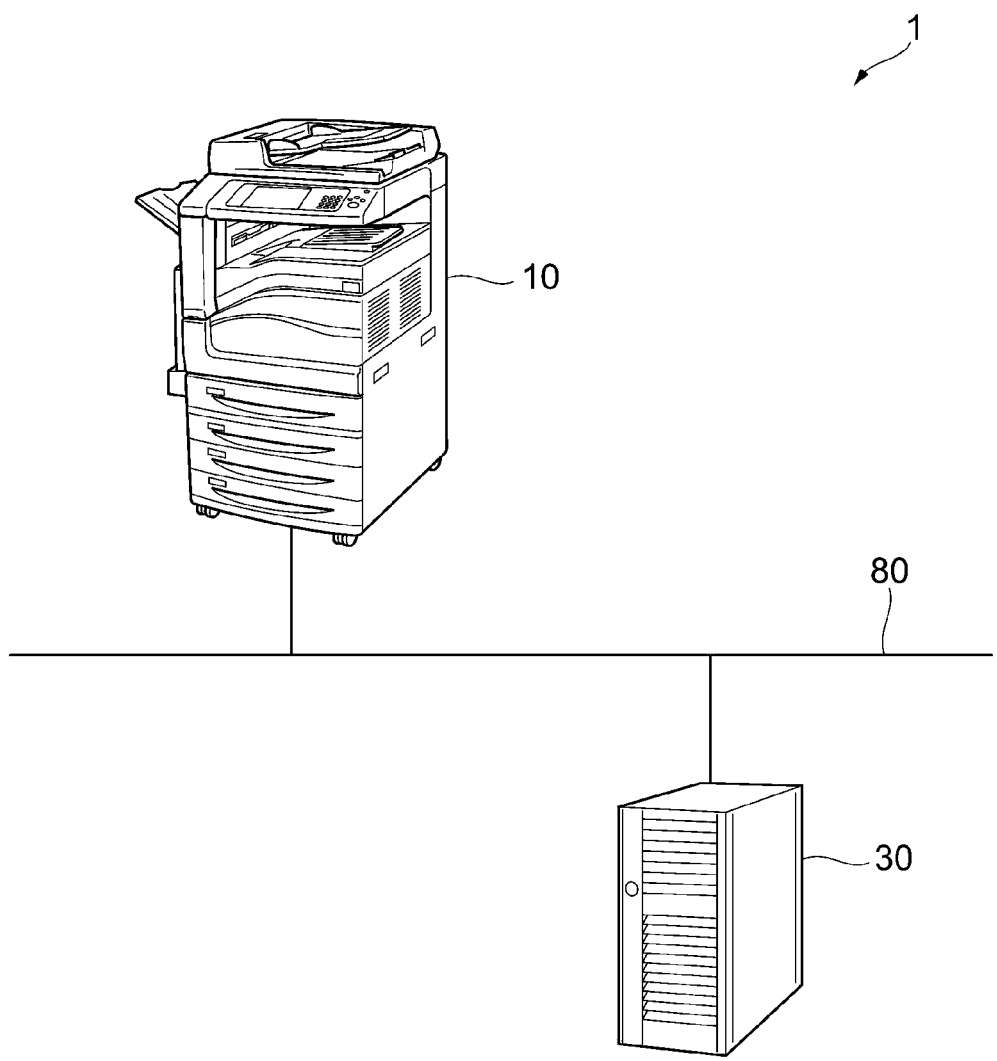
FIG. 1 illustrates an example of the overall configuration of a flow management system according to the exemplary embodiment.

FIG. 1 illustrates an example of the overall configuration of a flow management system 1 to which the exemplary embodiment is applied. As shown in FIG. 1, the flow management system 1 includes an image reading device 10 and a flow management device 30 that are connected to a communication network 80. Although only one image reading device 10 is shown in FIG. 1, two or more image reading devices 10 may be provided.

The image reading device 10 is a device that reads an image from a recording medium, such as paper. The image reading device 10 may be a device that also forms an image on a recording medium, such as paper, and sends and receives an image via a public network. The image reading device 10 is a scanner if it only reads an image. The image reading device 10 is a printer if it only prints an image. The image reading device 10 is a copying machine if it reads and prints an image. The image reading device 10 is a fax machine if it reads and sends an image or if it receives and prints an image. The image reading device 10 also has a function of reading an image from a recording medium, such as paper, and sending the read image to the flow management device 30.

The flow management device 30 is a device that manages a flow of routine processing. The flow management device 30 stores flow data indicating a flow of processing, and updates the flow data and executes processing based on the flow data by using an image read by the image reading device 10 from a recording medium.

The communication network 80 is a communication medium for information communication performed between the image reading device 10 and the flow management device 30. As the communication network 80, a local area network (LAN) or the Internet, for example, may be used.

[Hardware Configuration of Image Reading Device]

Figure 2:
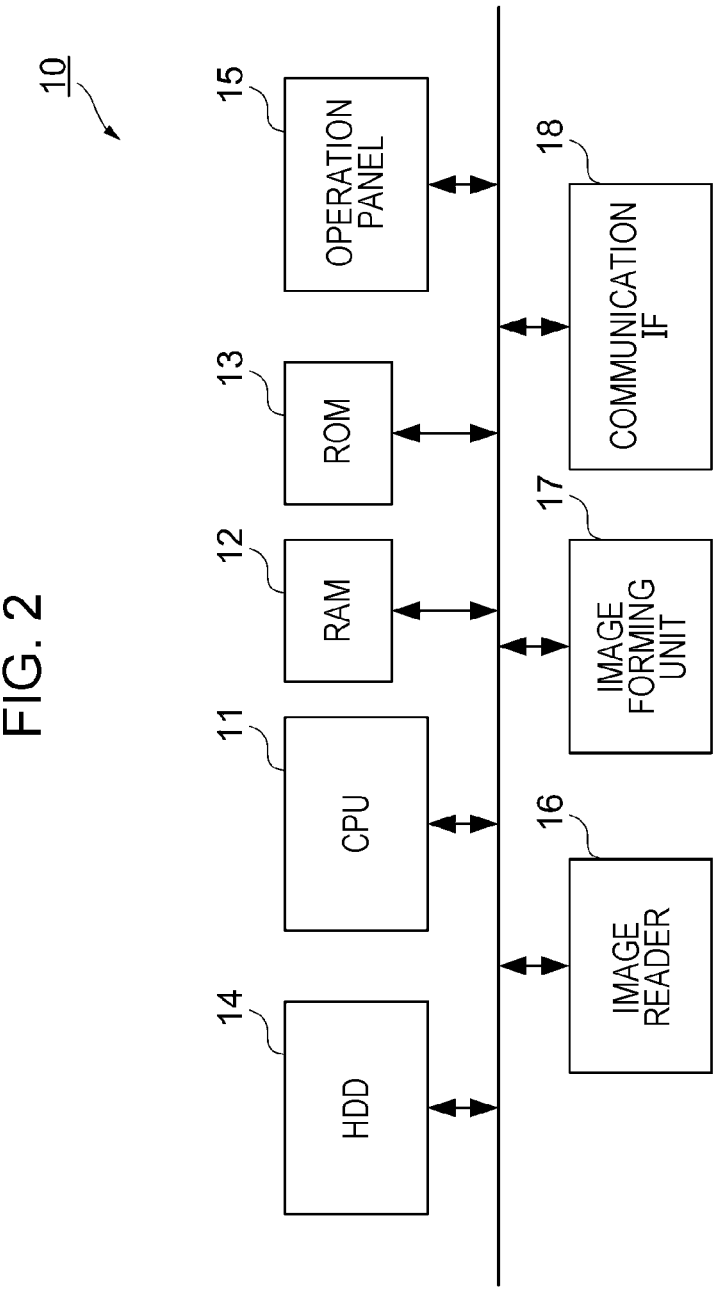
FIG. 2 is a block diagram illustrating an example of the hardware configuration of an image reading device according to the exemplary embodiment.

FIG. 2 is a block diagram illustrating an example of the hardware configuration of the image reading device 10 according to this exemplary embodiment. As shown in FIG. 2, the image reading device 10 includes a central processing unit (CPU) 11, a random access memory (RAM) 12, a read only memory (ROM) 13, a hard disk drive (HDD) 14, an operation panel 15, an image reader 16, an image forming unit 17, and a communication interface (IF) 18.

The CPU 11 loads various programs stored in the ROM 13 into the RAM 12 and executes them so as to implement the corresponding functions, which will be discussed later.

The RAM 12 is used as a work memory for the CPU 11. The ROM 13 stores various programs executed by the CPU 11. The HDD 14 stores image data read by the image reader 16 and image data used for forming an image by the image forming unit 17. An example of the HDD 14 is a magnetic disk drive.

The operation panel 15 is a touchscreen, for example, for displaying various items of information and receiving input of operation from a user. The operation panel 15 is constituted by a display for displaying various items of information and a position detection sheet for detecting the position pointed by a pointer, such as a finger or a stylus pen. Instead of a touchscreen, a display and a keyboard may be used as the operation panel 15.

The image reader 16 reads an image recorded on a recording medium, such as paper. The image reader 16 is a scanner, for example, and may be a charge coupled device (CCD) scanner or a contact image sensor (CIS) scanner. In a CCD scanner, light applied to a document from a light source and reflected by the document is reduced by a lens and is received by CCDs. In a CIS scanner, light sequentially applied to a document from light emitting diode (LED) light sources and reflected by the document is received by a CIS.

The image forming unit 17 forms an image on a recording medium, such as paper. The image forming unit 17 is a printer, for example, for forming an image based on an electrophotographic system or an inkjet method. In the electrophotographic system, an image is formed by transferring toner attached to a photoconductor drum to a recording medium. In the inkjet method, an image is formed by ejecting ink onto a recording medium.

The communication IF 18 sends and receives various items of information to and from another device, such as the flow management device 30, via the communication network 80.

[Hardware Configuration of Flow Management Device]

Figure 3:
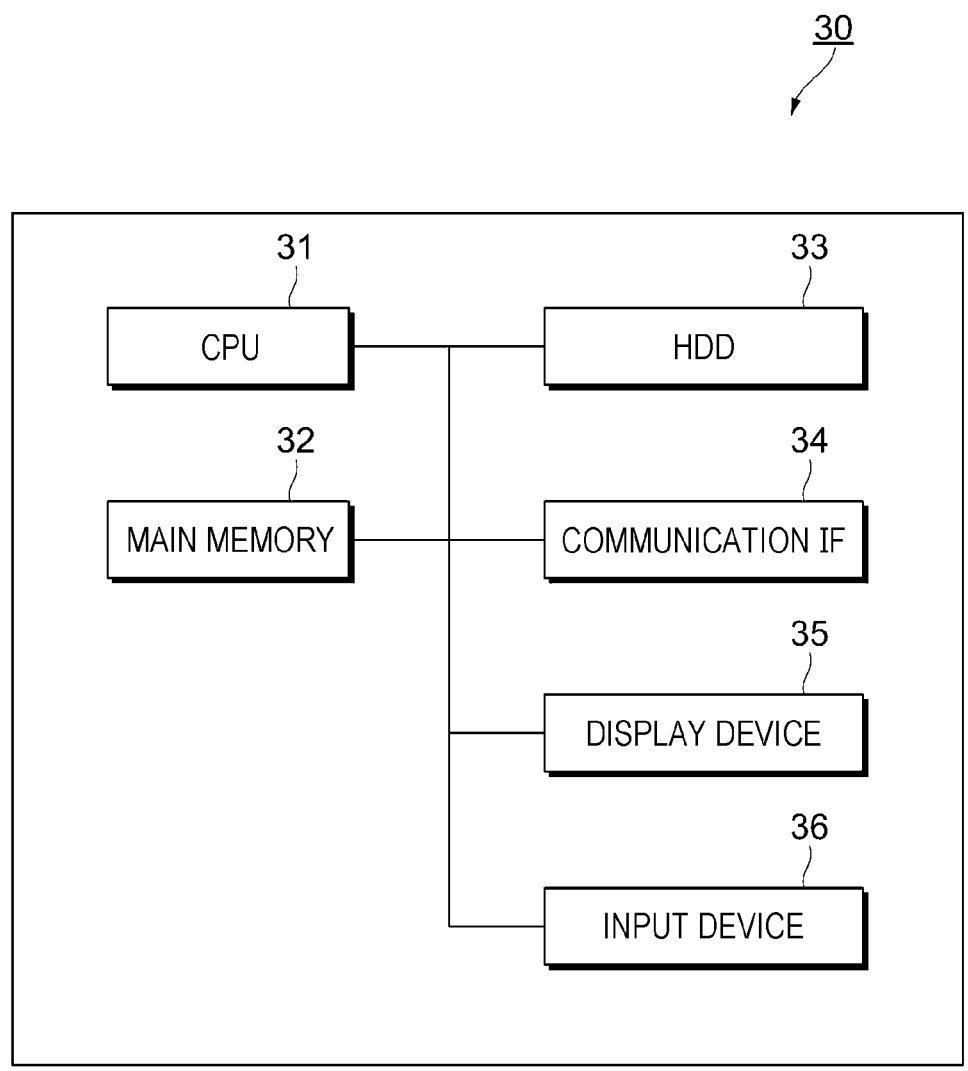
FIG. 3 is a block diagram illustrating an example of the hardware configuration of a flow management device according to the exemplary embodiment.

FIG. 3 is a block diagram illustrating an example of the hardware configuration of the flow management device 30. As shown in FIG. 3, the flow management device 30 includes a CPU 31, which is an arithmetic logic unit, a main memory 32, and an HDD 33, which are storages. The CPU 31 executes an operating system (OS) and various software programs, such as application programs, thereby implementing the corresponding functions, which will be discussed later. The main memory 32 is a storage in which various software programs and data used for executing the software programs are stored. The HDD 33 is a storage in which input data and output data for various software programs are stored. The flow management device 30 also includes a communication IF 34 for communicating with external devices, a display device 35, such as a display, and an input device 36, such as a keyboard and a mouse.

[Functional Configuration of Flow Management Device]

Figure 4:
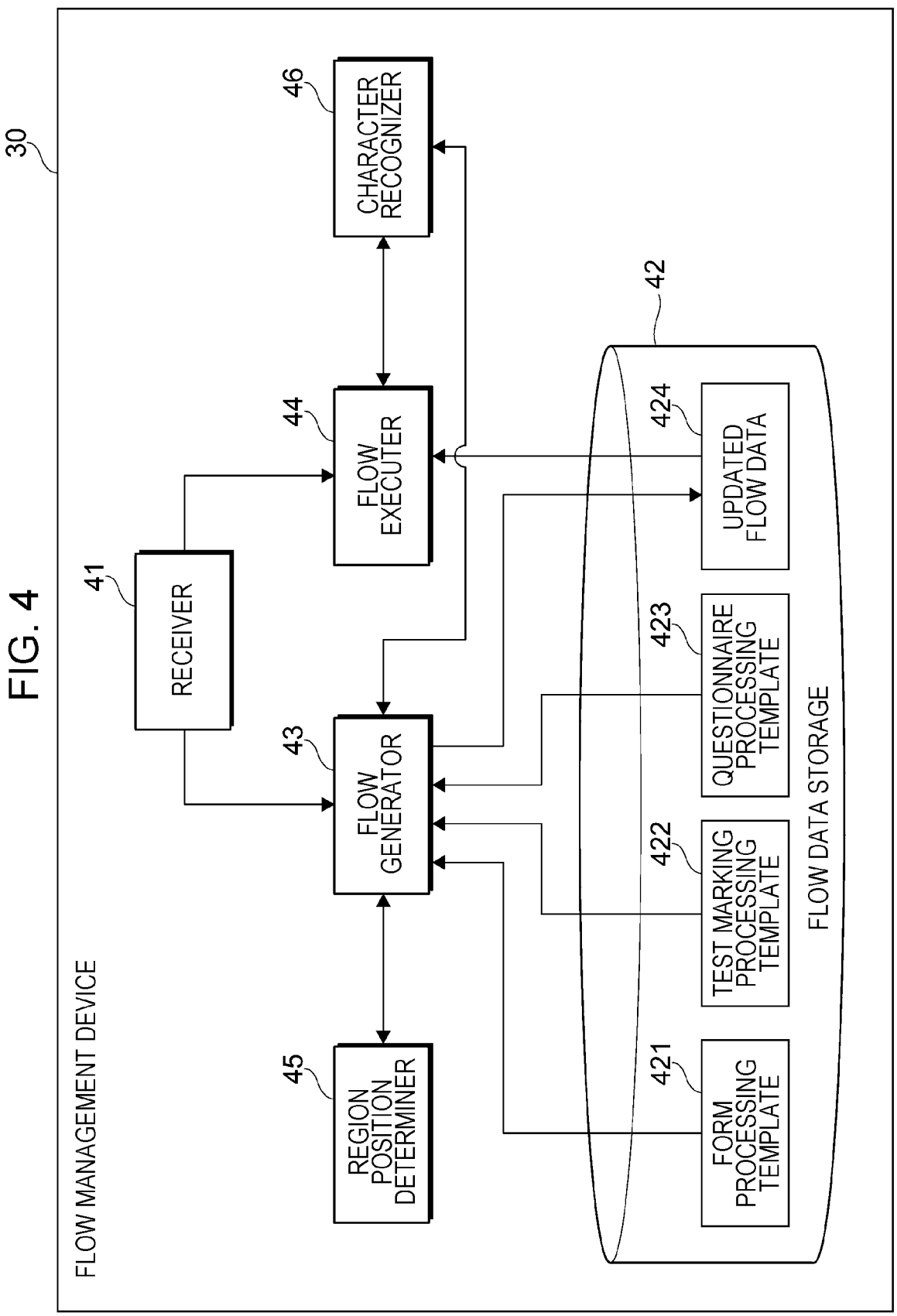
FIG. 4 is a block diagram illustrating an example of the functional configuration of the flow management device according to the exemplary embodiment.

FIG. 4 is a block diagram illustrating an example of the functional configuration of the flow management device 30 according to this exemplary embodiment. As shown in FIG. 4, the flow management device 30 includes a receiver 41, a flow data storage 42, a flow generator 43, a flow executer 44, a region position determiner 45, and a character recognizer 46.

The receiver 41 receives an image read by the image reading device 10. An example of the read image is a template document image generated as a result of the image reading device 10 reading a template document. In this sense, the receiver 41 is an example of an acquirer that acquires a template document image. Another example of the read image is a completed document image generated as a result of the image reading device 10 reading a completed document.

In the flow data storage 42, flow data indicating a flow of routine processing is stored. Flow data can largely be divided into two types.

The first type of flow data concerns a processing template which defines a basic flow of routine processing. A typical example of this type of data is flow data concerning a processing flow, part of which is not yet fixed. As routine processing, form processing, test marking processing, and questionnaire processing are assumed. As this type of flow data, a form processing template 421, a test marking processing template 422, and a questionnaire processing template 423 are stored in the flow data storage 42.

The second type of flow data is updated flow data concerning a processing template which is updated to adjust to an individual routine form. A typical example of this type of flow data is flow data concerning a processing template in which an unfixed portion is fixed. As this type of flow data, updated flow data 424 is stored in the flow data storage 42.

A processing flow is an example of a procedure of processing. Flow data is an example of processing procedure information indicating a procedure of processing.

The flow generator 43 obtains a template document image from the receiver 41. The flow generator 43 then updates a processing template (such as the form processing template 421, the test marking processing template 422, or the questionnaire processing template 423) stored in the flow data storage 42 by using the obtained template document image so as to generate new flow data. The flow generator 43 then stores this new flow data in the flow data storage 42 as the updated flow data 424. Updating of a processing template can largely be divided into two types.

The first type of updating is updating by correcting the content of a step which is already included in a processing template. For example, there is an unfixed portion in a step included in a processing template, and this unfixed portion is fixed. Examples of a step for which an unfixed portion will be fixed is an extracting step of extracting a region including a character image from a completed document and a list creating step of creating a list in which the recognition result of characters contained in the extracted region is stored. In the case of the extracting step, an unfixed portion is a position of a region to be extracted. In the case of the list creating step, an unfixed portion is a field name to be associated with the character recognition result in the list. Another example of the first type of updating is updating by changing part of a step which is already included in a processing template. An example of a step to be partly changed is a list storage step of storing a created list in a designated storage location. As a result of recognizing all characters in a template document image obtained from the receiver 41, if a keyword, such as "store", is found in the recognition results, followed by a character string of a folder, a list is stored in this folder as the storage location.

In the case of the first type of updating, the flow generator 43 is an example of an updater that updates processing procedure information to that indicating a procedure of processing including multiple steps including a specific step whose content is updated. The flow generator 43 is also an example of an updater that fixes an unfixed item of information among items of information which define the content of the specific step. The list is an example of a storage table for storing the character recognition results of a character image extracted from a completed document image. The list creating step is an example of a step of creating a storage table. A field name to be associated with a character recognition result in a list is an example of information indicating a field to be associated with a character recognition result in the storage table.

The second type of updating is updating by adding a new step to a processing template. An example of the second type of updating is adding a new step to a processing template as postprocessing. Examples of a new step are a list converting step of converting the format of a created list into a different format and a list sending step of sending a created list to a designated address. As a result of recognizing all characters in a template document image obtained from the receiver 41, if a keyword, such as "address", is found in the recognition results, followed by a character string of an email address, a list is sent to this email address by email. If the character string following the keyword is a telephone number, the list is sent to the address represented by this telephone number by fax. If the character string following the keyword is a cloud server address, the list is sent to this cloud server address. Adding of a step may be performed without user intervention, but options of processing to be added may be presented to a user and the user may be instructed to select one of them.

In the case of the second type of updating, the flow generator 43 is an example of an updater that updates processing procedure information to that indicating a procedure of processing including multiple steps to which a specific step is added. The list converting step is an example of a step of converting the format of a result obtained by executing processing based on a completed document image. The list sending step is an example of a step of sending a result obtained by executing processing based on a completed document image to a designated destination.

In the first type of updating, the extracting step of extracting a region including a character image from a completed document has been discussed as a step of updating the content of the step by fixing an unfixed portion. However, the extracting step may not necessarily be a step of updating the content of the step by fixing an unfixed portion. In this case, the flow generator 43 is an example of an updater that updates, based on a template document image, processing procedure information to that indicating a procedure of processing including the extracting step and a step whose content is updated.

The flow executer 44 obtains a completed document image from the receiver 41. The flow executer 44 then executes a processing flow in accordance with the updated flow data 424 stored in the flow data storage 42, based on the obtained completed document image.

The region position determiner 45 obtains a template document image from the flow generator 43 and determines a position of a region to be extracted from the template document image. For example, the region position determiner 45 determines the position of a region defined by a frame as a region to be extracted. To determine the position of a region, an existing technique may be used. The region position determiner 45 then outputs the determined position of a region to the flow generator 43.

The character recognizer 46 obtains the template document image and the positions of regions to be extracted from the flow generator 43 or the flow executer 44, and recognizes printed characters and handwritten characters within the regions of the template document image to be extracted. Recognition of printed and handwritten characters is performed by using an existing technique. The character recognizer 46 then outputs the character recognition results to the flow generator 43 or the flow executer 44.

[Operation of Flow Management Device]

As discussed above, as routine processing, form processing, test marking processing, and questionnaire processing are assumed. A description will now be given of the operation of the flow management device 30 when routine processing is form processing, the operation when routine processing is test marking processing, and the operation when routine processing is questionnaire processing.

FIG. 5 is a flowchart illustrating an example of the operation of the flow management device 30 when routine processing is form processing.

A description will be given of processing to be executed when a template document of a form to be processed this time (hereinafter also called the subject form) is read by the image reading device 10. This processing will be called first processing.

In step S111, the receiver 41 of the flow management device 30 receives a template document image generated as a result of the image reading device 10 reading the template document. The template document image is output to the flow generator 43 and is further to the region position determiner 45.

Then, in step S112, the region position determiner 45 determines positions of regions to be extracted from the template document image. The region position determiner 45 determines the positions of regions to be extracted based on frames printed on the form, for example, by using an existing technique.

Then, in step S113, the flow generator 43 extracts regions including field names and those of field values from the template document image, and displays the analysis results on the display device 35 (see FIG. 3). It is assumed that the flow generator 43 has extracted regions where field names, such as "ruby characters" (phonetic guide), "name", "address", and "telephone number", are printed and regions where field values corresponding to these field names will be input. The analysis results indicate the field names, the positions of the regions of field values, and the relationship between the field names and field values.

When the analysis results are displayed on the display device 35, a user makes correction to the analysis results if necessary. Then, in step S114, the flow generator 43 corrects the analysis results in accordance with the corrections made by the user.

Then, in step S115, the flow generator 43 creates a list of the field names and field values. The field names in the list are "ruby characters", "name", "address", and "telephone number", for example. These field names are obtained as a result of the flow generator 43 specifying the template document image and the positions of the regions and causing the character recognizer 46 to recognize characters in the regions. At this stage, field values are not yet stored in the list.

Then, in step S116, the flow generator 43 updates the form processing template 421 and stores it as the updated flow data 424 for the subject form. Updating of the form processing template 421 to the updated flow data 424 is updating the form processing template 421 by fixing an unfixed portion in the extracting step or the list creating step of the form processing template 421.

A description will now be given of processing to be executed when a completed document of the subject form is read by the image reading device 10. This processing will be called processing from the second time.

In step S121, the receiver 41 of the flow management device 30 receives a completed document image generated as a result of the image reading device 10 reading a completed document. The completed document image is then output to the flow executer 44.

Then, in step S122, the flow executer 44 extracts field values from the corresponding regions determined in step S112 of the completed document image received in step S121. The regions determined in step S112 includes the regions of the field names. However, the field names have already been extracted in step S113, and thus, only the field values are extracted in step S122.

Then, in step S123, the flow executer 44 calls the character recognizer 46 and causes it to perform character recognition of the field values. Then, in step S124, the flow executer 44 adds the character recognition results to the list created in step S115.

The flow executer 44 judges in step S125 whether there is another completed document image. If there is another completed document image, the flow executer 44 returns to step S121. If there is no completed document image, it means that the field values have been extracted from all the completed document images and have been stored in the list. The flow executer 44 then proceeds to final processing.

Final processing will now be discussed.

In final processing, in step S131, the flow executer 44 stores the list to which the field values are added in step S124 in a specific location.

Figure 6:
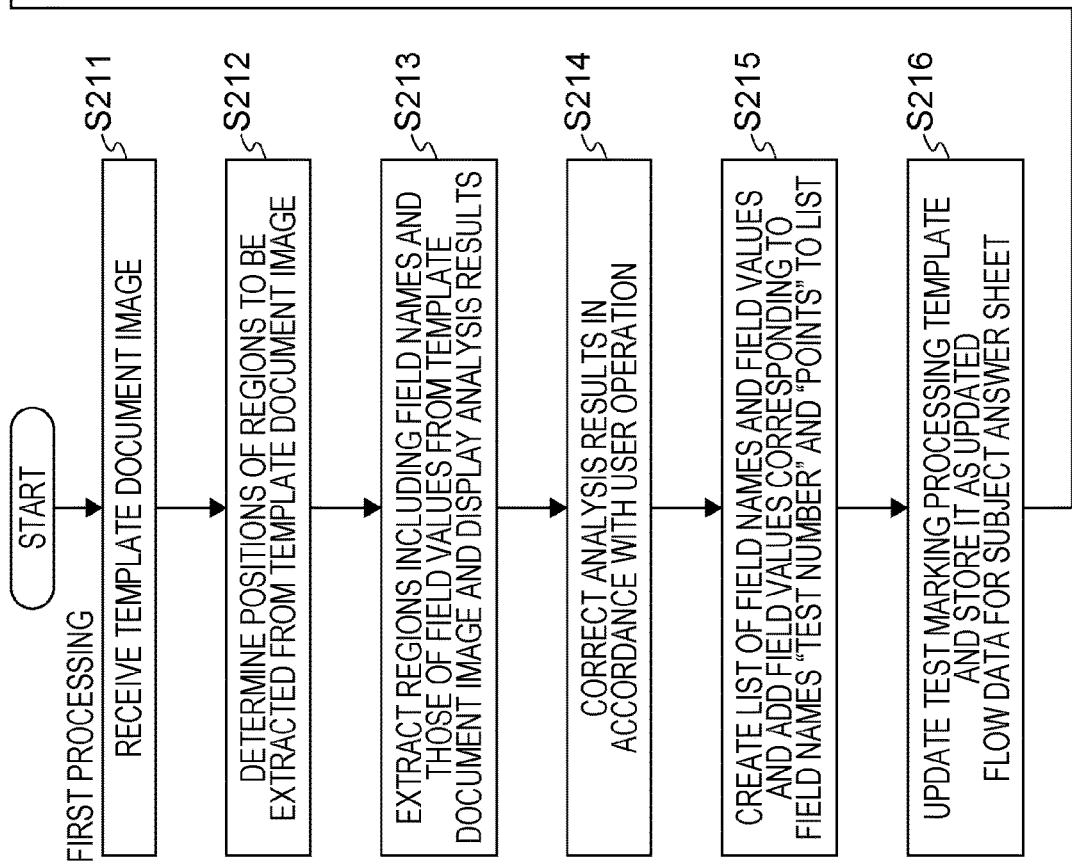
FIG. 6 is a flowchart illustrating an example of the operation of the flow management device according to the exemplary embodiment when routine processing is test marking processing.

FIG. 6 is a flowchart illustrating an example of the operation of the flow management device 30 when routine processing is test marking processing.

A description will first be given of processing to be executed when a template document of an answer sheet to be processed this time (hereinafter may also be called the subject answer sheet) is read by the image reading device 10. This processing will be called first processing.

In step S211, the receiver 41 of the flow management device 30 receives a template document image generated as a result of the image reading device 10 reading the template document. The template document image is output to the flow generator 43 and is further to the region position determiner 45.

Then, in step S212, the region position determiner 45 determines positions of regions to be extracted from the template document image. The region position determiner 45 determines positions of regions to be extracted based on frames printed on the answer sheet, for example, by using an existing technique.

Then, in step S213, the flow generator 43 extracts regions including field names and those of field values from the template document image, and displays the analysis results on the display device 35 (see FIG. 3). It is assumed that the flow generator 43 has extracted regions where field names, such as "examinee ID", "examinee name", "test number", "answer result", and "points", are printed, regions where field values corresponding to some of the field names, such as "test number" and "points", are printed, and regions where field values will be input in association with some of the field names, such as "examinee ID", "examinee name", and "answer result". However, if the answer sheet does not include regions where field names "test number" and "answer result" are printed, a region where a field value corresponding to the field name "test number" is printed and a region where a field value corresponding to the field name "answer result" will be input may be extracted to create field names "test number" and "answer result". The analysis results indicate the field names, the positions of the regions of field values, and the relationship between the field names and field values.

When the analysis results are displayed on the display device 35, a user makes correction to the analysis results if necessary. Then, in step S214, the flow generator 43 corrects the analysis results in accordance with the corrections made by the user.

Then, in step S215, the flow generator 43 creates a list of the field names and field values, and adds field values corresponding to the field names "test number" and "points" to the list. The field names in the list are "examinee ID", "examinee name", "test number", "answer result", and "points", for example. In the list, the field values corresponding to the field names "test number" and "points" are stored. These field names and field values are obtained as a result of the flow generator 43 specifying the template document image and the positions of the regions of the field names and field values and causing the character recognizes 46 to recognize characters in the regions. At this stage, field values corresponding to the field names "examinee ID", "examinee name", and, "answer result" are not yet stored in the list.

Then, in step S216, the flow generator 43 updates the test marking processing template 422 and stores it as the updated flow data 424 for the subject answer sheet. Updating of the test marking processing template 422 to the updated flow data 424 is updating the test marking processing template 422 by fixing an unfixed portion in the extracting step or the list creating step of the test marking processing template 422.

A description will now be given of processing to be executed when a completed document of the subject answer sheet is read by the image reading device 10. This processing will be called processing from the second time.

In step S221, the receiver 41 of the flow management device 30 receives a completed document image generated as a result of the image reading device 10 reading a completed document. The completed document image is then output to the flow executer 44.

Then, in step S222, the flow executer 44 extracts field values of "examinee ID", "examinee name", and, "answer result" from the corresponding regions determined in step S212 of the completed document image received in step S221. The regions determined in step S212 includes the regions including the field names and those of the field values. However, the field names and the field values of "test number" and "points" have already been extracted in step S213, and thus, only the field values of "examinee ID", "examinee name", and, "answer result" are extracted in step S222.

Then, in step S223, the flow executer 44 calls the character recognizer 46 and causes it to perform character recognition of the field values of "examinee ID" and "examinee name" and also to recognize whether the field value of "answer result" indicates a check mark (correct) or a cross mark (wrong). More specifically, in the region where a field value of "answer result" is input, a check mark or a cross mark is added to show whether the answer is right or wrong. Then, in step S224, the flow executer 44 adds the recognition results to the list created in step S215.

The flow executer 44 then judges in step S225 whether there is another completed document image. If there is another completed document image, the flow executer 44 returns to step S221. If there is no completed document image, it means that the field values have been extracted from all the completed document images and have been stored in the list. The flow executer 44 then proceeds to final processing.

Final processing will be discussed below.

In final processing, in step S231, the flow executer 44 stores the list to which the field values are added in step S224 in a specific location.

FIG. 7 is a flowchart illustrating an example of the operation of the flow management device 30 when routine processing is questionnaire processing.

A description will first be given of processing to be executed when a template document of a questionnaire sheet to be processed this time (may also be called the subject questionnaire sheet) is read by the image reading device 10. This processing will be called first processing.

In step S311, the receiver 41 of the flow management device 30 receives a template document image generated as a result of the image reading device 10 reading the template document. The template document image is output to the flow generator 43 and is further to the region position determiner 45.

Then, in step S312, the region position determiner 45 determines positions of regions to be extracted from the template document image. The region position determiner 45 determines positions of regions to be extracted based on frames printed on the questionnaire sheet, for example, by using an existing technique.

Then, in step S313, the flow generator 43 extracts regions including field names and those of field values from the template document image, and displays the analysis results on the display device 35 (see FIG. 3). It is assumed that the flow generator 43 has extracted regions where field names, such as "question number" and "selection result", are printed and regions where field values are input in association with these field names. However, if the questionnaire does not have a region where the field name "selection result" is printed, a region where a field value corresponding to the field name "selection result" is input may be extracted to create a field name "selection result". Additionally, in questionnaire processing, a field name "to be aggregated", which is not a field name obtained from an extracted region, is also created. The analysis results indicate the field names, the positions of the regions of field values, and the relationship between the field names and field values.

When the analysis results are displayed on the display device 35, a user makes correction to the analysis results if necessary. Then, in step S314, the flow generator 43 corrects the analysis results in accordance with the corrections made by the user.

Then, in step S315, the flow generator 43 creates a list of the field names and field values, and adds a field value corresponding to the field name "question number" to the list. The field names in the list are "question number", "selection result", and "to be aggregated", for example. In the list, a field value of "question number" is stored. The field names other than "to be aggregated" and the field value are obtained as a result of the flow generator 43 specifying the template document image and the positions of the regions and causing the character recognizer 46 to recognize characters in the regions. At this stage, field values of "selection result" and "to be aggregated" are not yet stored in the list.

Then, in step S316, if a question number concerns a question to be aggregated, the flow generator 43 appends an aggregation mark to each of such question numbers. For example, a check mark is appended as the field value of "to be aggregated". Whether a question number concerns a question to be aggregated is determined in advance according to the purpose of a questionnaire, such as questions 1, 2, and 3 will be aggregated, and question 4 will not be aggregated.

Then, in step S317, the flow generator 43 creates an aggregation table concerning the question numbers appended with an aggregation mark. The aggregation table has a question number field, an option field, and a number-of-responders field. In the question number field, the question numbers obtained as a result of the character recognizer 46 performing character recognition in step S315 are stored. In the option field, option numbers provided for "question number" are stored. The option numbers are also obtained as a result of the character recognizes 46 performing character recognition. For example, if five options are provided for question number 1, the first row of the aggregation table shows that the question number field is "1" and the option field is "1", the second row shows that the question number field is "1" and the option field is "2", the third row shows that the question number field is "1" and the option field is "3", the fourth row shows that the question number field is "1" and the option field is "4", and the fifth row shows that the question number field is "1" and the option field is "5".

Then, in step S318, the flow generator 43 updates the questionnaire processing template 423 and stores it as the updated flow data 424 for the subject questionnaire sheet. Updating of the questionnaire processing template 423 to the updated flow data 424 is updating the questionnaire processing template 423 by fixing an unfixed portion in the extracting step or the list creating step of the questionnaire processing template 423.

A description will now be given of processing to be executed when a completed document of the subject questionnaire sheet is read by the image reading device 10. This processing will be called processing from the second time.

In step S321, the receiver 41 of the flow management device 30 receives a completed document image generated as a result of the image reading device 10 reading a completed document. The completed document image is then output to the flow executer 44.

Then, in step S322, the flow executer 44 extracts the field value of "selection result" from the corresponding region determined in step S312 of the completed document image received in step S321. The regions determined in step S312 includes the regions of the field names and those of the field values. The field names and the field value of "question number" have already been extracted in step S313, and thus, only the field value of "selection result" is extracted in step S322.

Then, in step S323, the flow executer 44 calls the character recognizer 46 and causes it to recognize characters in the field value of "selection result". Then, in step S324, the flow executer 44 adds the character recognition results to the list created in step S315.

The flow executer 44 then judges in step S325 whether there is another completed document image. If there is another completed document image, the flow executer 44 returns to step S321. If there is no completed document image, it means that the field values have been extracted from all the completed document images and have been stored in the list. The flow executer 44 then proceeds to final processing.

Final processing will be discussed below.

In final processing, in step S331, the flow executer 44 executes aggregation processing for each of the options provided for a question to be aggregated. For example, the flow executer 44 counts the number of questionnaire responders selected each of the options provided for each of the question numbers appended with an aggregation mark, and stores the counted number in the number-of-responders field of the aggregation table.

Then, in step S332, the flow executer 44 stores the list to which the field values are added in step S324 and the aggregation table in a specific location.

Examples of the operations executed by the flow management device 30 when routine processing is form processing, test marking processing, and questionnaire processing have been discussed. In each of the operations, in the first processing, the type of routine processing is selected and a corresponding template document is read. Then, an unfixed portion of the extracting step and that of the list creating step of the processing template are fixed, and flow data dedicated to this template document is created. In the processing from the second time, a user merely provides an instruction to read a completed document, thereby executing the rest of processing.

In the reading step of the first processing, a template document is desirably read. Without a template document, however, a completed document may be read instead of a template document. In this case, the same completed document is read in the processing from the second time.

If a template document is not provided or there is only one completed document, it may not be possible to determine the frames of field names and field values. In this case, plural completed documents are read as preprocessing of each routine processing. Then, from the resulting plural completed document images, portions where dots or lines frequently overlap each other are assumed as the same portion of the plural completed documents, and dots or lines of the same portion are assumed as dots or lines in a template document.

Specific Examples

Figure 8:
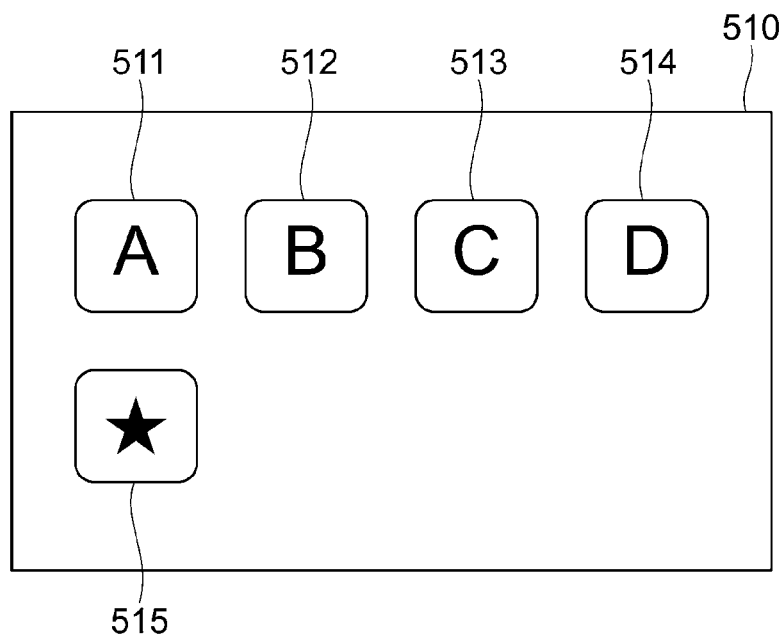
FIG. 8 illustrates an example of an initial screen to be displayed in processing executed for the first time (first processing) in the exemplary embodiment.

FIG. 8 illustrates an example of an initial screen 510 displayed on the operation panel 15 (see FIG. 2) of the image reading device 10. On the initial screen 510, buttons 511 through 514 for executing processing based on a completed document are displayed. "A", "B", "C", and "D" described on the buttons 511 through 514 are the names assigned to the updated flow data 424 for executing processing based on a completed document. A button 515 for executing processing based on a template document is also displayed on the initial screen 510.

When executing the first processing, a user presses the button 515 on the initial screen 510 to call a service for executing processing based on a template document. Then, the image reading device 10 displays a menu screen 520 on the operation panel 15.

Figure 9:
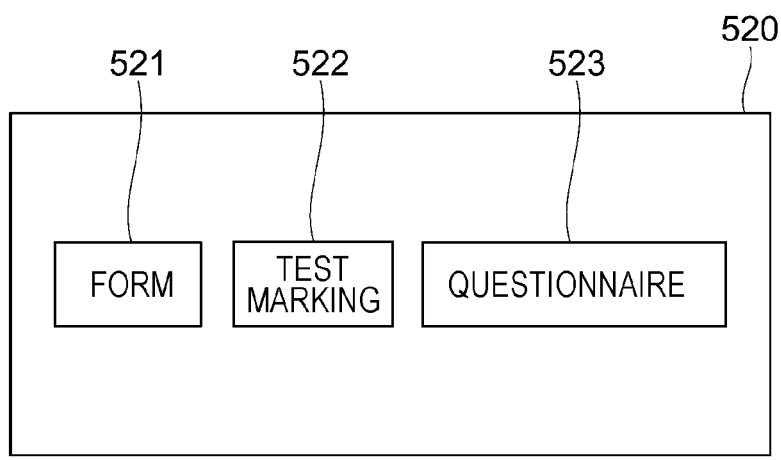
FIG. 9 illustrates an example of a menu screen to be displayed in the first processing in the exemplary embodiment.

FIG. 9 illustrates an example of the menu screen 520. On the menu screen 520, buttons 521 through 523 for reading template documents for routine processing are displayed. When the button 521 is pressed, the template document for form processing is read. When the button 522 is pressed, the template document for test marking processing is read. When the button 523 is pressed, the template document for questionnaire processing is read.

A user selects and presses one of the buttons 521 through 523 on the menu screen 520. No matter which one of the buttons 521 through 523 is pressed, the flow is substantially the same although the content of processing is different. It is thus assumed that the user has pressed the button 521 to read the template document for form processing. The image reading device 10 then sends a template document image obtained by reading the template document for flow processing to the flow management device 30.

Then, the flow management device 30 executes the first processing shown in FIG. 5.

In step S111, the receiver 41 receives the template document image from the image reading device 10.

In step S112, the region position determiner 45 determines positions of regions to be extracted from the template document image.

FIG. 10 illustrates an example of an extraction result screen 530 indicating the positions of regions to be extracted. As information concerning regions to be extracted, frames 531a through 531i of the regions of field names and frames 532a through 532i of the regions of field values are shown. Although the frames 531a through 531i and the frames 532a through 532i are represented in the same thickness in FIG. 10, they may be distinguished from each other in a certain manner, for example, they may be displayed in different colors. Although the extraction result screen 530 alone is shown in FIG. 10, a template document image without thick frames which define the regions to be extracted may also be displayed next to the extraction result screen 530.

In step S113, the flow generator 43 analyzes the template document image and extracts the regions including field names and those of field values from the template document image, and displays the analysis results on the display device 35 (see FIG. 3).

Figure 11:
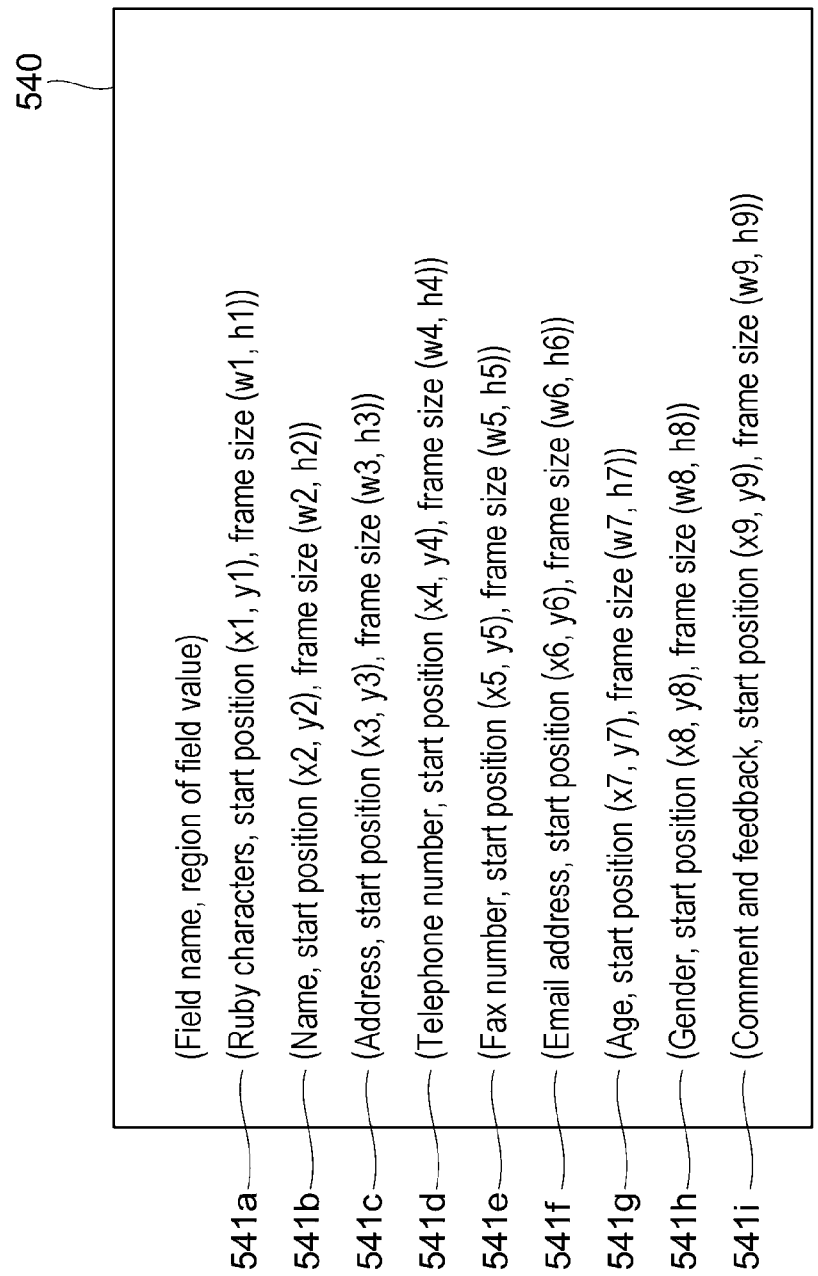
FIG. 11 illustrates an example of an analysis result screen to be displayed in the first processing in the exemplary embodiment.

FIG. 11 illustrates an example of an analysis result screen 540 showing the analysis results. On the analysis result screen 540, descriptions 541a through 541i which associate the field names with the positions and the sizes of the regions of field values are displayed.

The user checks the positions of the regions of field values and the relationship between the field names and field values on the analysis result screen 540. Then, the user makes correction to the analysis results if necessary.

In step S114, the flow generator 43 corrects the analysis results in accordance with the user operation. Then, the positions of regions to be extracted are corrected accordingly.

FIG. 12 illustrates an example of a corrected extraction result screen 550 showing the corrected positions of the regions. On the corrected extraction result screen 550, frames 551a through 551i of the regions of the field names and frames 552a through 552i of the regions of field values look more like the frames of an actual form than the frames 531a through 531i and the frames 532a through 532i shown in FIG. 10.

After checking the positions of the regions of field values and the relationship between the field names and field values, the user presses a button 553.

Then, in step S115, the flow generator 43 creates a list of the field names and field values. In the example of the form shown in FIGS. 10 through 12, the flow generator 43 creates a list including field names "ruby characters", "name", "address", "telephone number", "FAX number", "email address", "age", "gender", and "comment and feedback". At this stage, the template document for form processing is simply read, and field values are not yet set for the field names. The field values in the list are thus blank.

In step S116, the flow generator 43 updates the form processing template 421 and stores it as the updated flow data 424 for this form.

Figure 13:
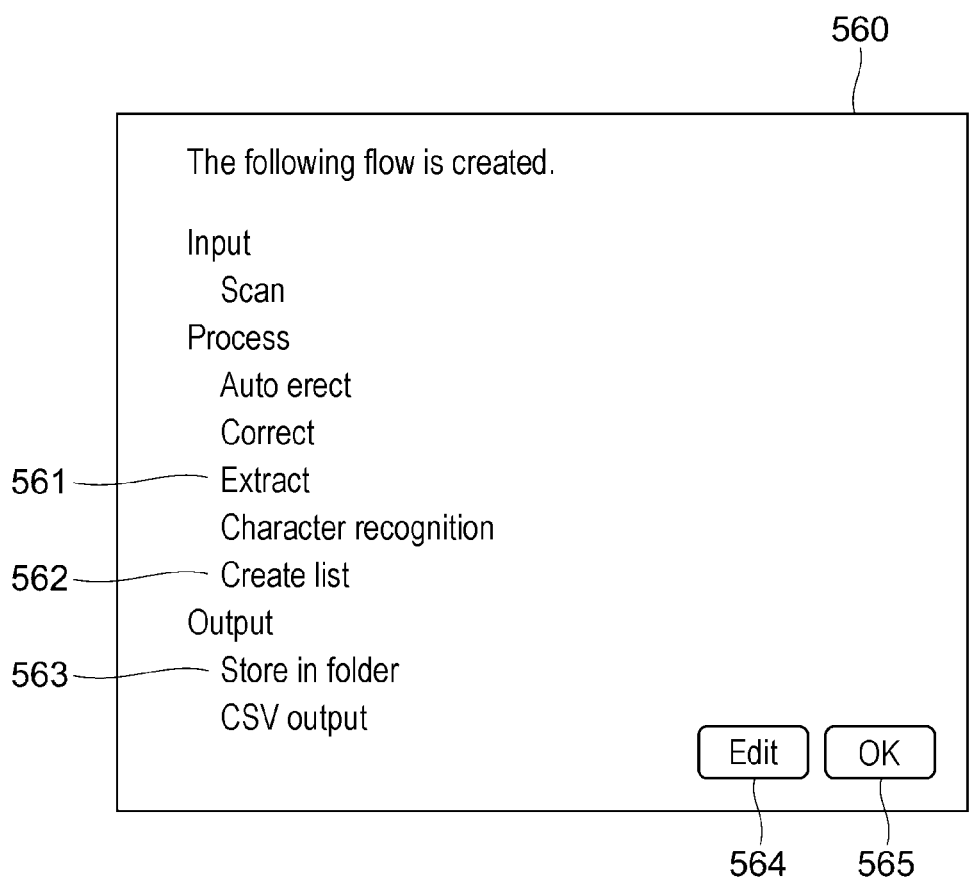
FIG. 13 illustrates an example of a flow creation complete screen to be displayed in the first processing in the exemplary embodiment.

FIG. 13 illustrates an example of a flow creation complete screen 560 to be displayed when the form processing template 421 is updated to the updated flow data 424. In FIG. 13, only the step names of a processing flow are shown, and information concerning the steps is not given. In actuality, however, information is described in each of unfixed portions of some steps of this flow, and may thus be described on the flow creation complete screen 560. For example, in a description 561 for the extracting step, the positions of regions to be extracted may be indicated, and a description 562 for the list creating step, field names to be included in the list may be indicated. Additionally, although it is not shown in the example in FIGS. 10 through 12, if a folder name is described in the template document, it may be selected as a storage location of the list and may be indicated in a description 563 for a folder storage step.

If a user wishes to change the content of the processing flow displayed on the flow creation complete screen 560 or to add a step to the processing flow, the user presses a button 564 to edit the content of the processing flow. This enables the user to change the content of the processing flow or to add a step to the processing flow. For example, on the flow creation complete screen 560, the storage location of the list may be described as a parameter, and the user may change this parameter.

After finishing editing the content of the processing flow, the user presses a button 565, and then, the updated flow data 424 for this form is stored. From the second time, the user is able to simply execute routine processing without correcting the processing flow.

Figure 14:
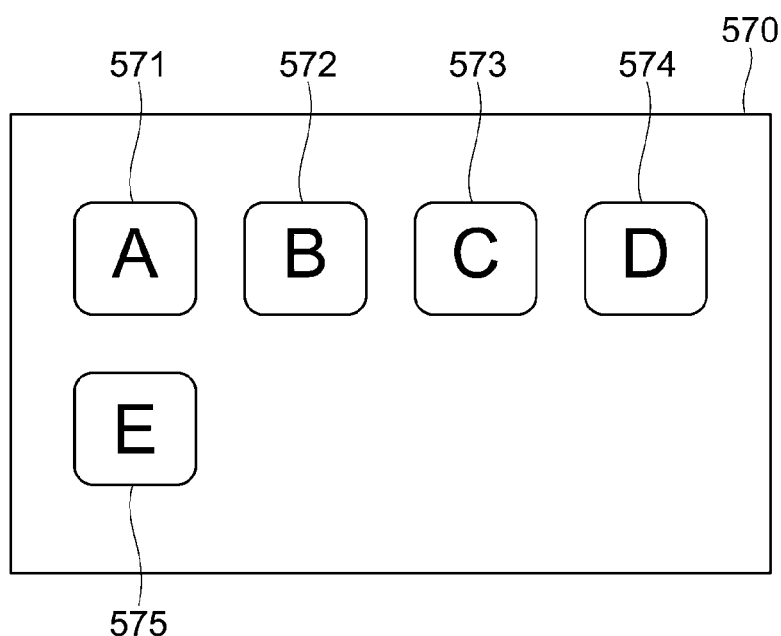
FIG. 14 illustrates an example of an initial screen to be displayed in processing executed from the second time in the exemplary embodiment.

FIG. 14 illustrates an example of an initial screen 570 displayed on the operation panel 15 of the image reading device 10 when the updated flow data 424 is stored. On the initial screen 570, buttons 571 through 575 for executing processing based on a completed document are displayed. The buttons 571 through 574 correspond to the buttons 511 through 514 on the initial screen 510 shown in FIG. 8. The button 575 is a new button for executing processing based on a completed document, which is created as a result of executing the first processing by pressing the button 515 shown in FIG. 8. "E" described on the button 575 represents the name assigned to the updated flow data 424 for executing processing based on a completed document.

When executing processing for the subject form from the second time, a user presses the button 575 on the initial screen 570 to read a completed document obtained by filling characters into the form. The image reading device 10 then sends a completed document image obtained by reading the completed document to the flow management device 30.

The flow management device 30 then executes the processing from the second time shown in FIG. 5.

In step S121, the receiver 41 receives the completed document image from the image reading device 10.

In step S122, the flow executer 44 extracts field values from the regions of the completed document image determined in the first processing.

FIG. 15 illustrates an example of an extraction result screen 580 when field values are extracted. On the extraction result screen 580, frames 581a through 581i of the regions of the field names and frames 582a through 582i of the regions of field values are displayed. The frames 581a through 581i correspond to the frames 551a through 551i shown in FIG. 12, while the frames 582a through 582i correspond to the frames 552a through 552i shown in FIG. 12. On the extraction result screen 580, the field values extracted from the completed document image are set in the frames 582a through 582i.

In step S123, the flow executer 44 calls the character recognizer 46 and causes it to recognize the characters of the field values. In the example of the form shown in FIG. 15, "SUZUKI Tatsuya", "鈴木達矢", "XX-ku, Yokohama-shi, . . . ", "045-XXX-XXX", "suzuki@xxx.xx.xx", and "male", and "I would like to apply for . . . " are obtained as the field values.

Then, in step S124, the flow executer 44 stores the character recognition results in the list. In the example of the form shown in FIG. 15, a list in which the field values "SUZUKI Tatsuya", "鈴木達矢", "XX-ku, Yokohama-shi, . . . ", "045-XXX-XXX", "suzuki@xxx.xx.xx", and "male", and "I would like to apply for . . . " are set in the field names "ruby characters", "name", "address", "telephone number", "email address", "gender", and "comment and feedback", respectively, is obtained.

The flow management device 30 then executes the final processing shown in FIG. 5.

In step S131, the flow executer 44 stores the list in a specific location.

[Program]

Processing executed by the flow management device 30 according to this exemplary embodiment may be implemented as a program, such as an application software program.

The program implementing this exemplary embodiment is a program for executing an acquiring function and an updating function. The acquiring function acquires a template document image obtained as a result of reading a template document. The updating function updates, based on the template document image, processing procedure information indicating a procedure of processing including an extracting step and another step to processing procedure information indicating a procedure of processing including the extracting step and a step whose content is updated. The processing is processing to be executed based on a completed document image obtained as a result of reading a completed document generated by filling characters into the template document. The extracting step is a step of extracting a region including a character image from the completed document image.

The program implementing this exemplary embodiment may be provided by a communication medium or may be stored in a recording medium, such as a compact disc-read only memory (CD-ROM), and be provided.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiments was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed:

1. An information processing apparatus comprising:
a hardware processor configured to:
acquire a template document image obtained as a result of reading a template document; and
update, based on the template document image, processing procedure information indicating a procedure of processing including an extracting step and another step, wherein
the extracting step is to extract a region including a character image from a completed document image and the other step is to store a recognition result of characters contained in the extracted region into a storage table,
the hardware processor updates the region by fixing an unfixed portion in the extracting step,
the procedure of processing is executed based on the completed document image obtained as a result of reading a completed document generated by filling the characters into the template document,
the unfixed portion comprises a position of the region to be extracted, a size of the region to be extracted, and a field name to be associated with the character recognition result in the storage table, the region comprises a frame of the field name and a frame of a field value where the characters to be set, the region is updated by correcting the frame of the field name and the frame of the field value to be an actual form having inline of the position and the size, the recognition result of the characters corresponding to the field value is set n the frame of the field value associated with the frame of the field name.

2. The information processing apparatus according to claim 1, wherein the hardware processor updates, based on the template document image, the processing procedure information by including a specific step.

3. The information processing apparatus according to claim 2, wherein updating of the content of the specific step includes fixing of an unfixed item of information among items of information which define the content of the specific step.

4. The information processing apparatus according to claim 3, wherein:

the specific step is a step of generating a storage table for storing a character recognition result of the character image extracted from the completed document image.

5. The information processing apparatus according to claim 1, wherein the hardware processor updates, based on the template document image, the processing procedure information to which a specific step is added.

6. The information processing apparatus according to claim 5, wherein the specific step is a step of converting a format of a result obtained by executing the processing based on the completed document image.

7. The information processing apparatus according to claim 5, wherein the specific step is a step of sending a result obtained by executing the processing based on the completed document image to a designated destination.

8. A non-transitory computer readable medium storing a program causing a computer to execute a process, the process comprising:

acquiring a template document image obtained as a result of reading a template document; and updating, based on the template document image, processing procedure information indicating a procedure of processing including an extracting step and another step, wherein the extracting step is to extract a region including a character image from a completed document image and the other step is to store a recognition result of characters contained in the extracted region into a storage table, updating the region by fixing an unfixed portion in the extracting step, the procedure of processing is executed based on the completed document image obtained as a result of reading a completed document generated by filling the characters into the template document, the unfixed portion comprises a position of the region to be extracted, a size of the region to be extracted, and a field name to be associated with the character recognition result in the storage table, the region comprises a frame of the field name and a frame of a field value where the characters to be set, the region is updated by correcting the frame of the field name and the frame of the field value to be an actual form having inline of the position and the size, the recognition result of the characters corresponding to the field value is set in the frame of the field value associated with the frame of the field name.

9. An information processing method comprising:

acquiring a template document image obtained as a result of reading a template document; and updating, based on the template document image, processing procedure information indicating a procedure of processing including an extracting step and another step, wherein the extracting step is to extract a region including a character image from a completed document image and the other step is to store a recognition result of characters contained in the extracted region into a storage table, updating the region by fixing an unfixed portion in the extracting step, the procedure of processing is executed based on the completed document image obtained as a result of reading a completed document generated by filling the characters into the template document, the unfixed portion comprises a position of the region to be extracted, a size of the region to be extracted, and a field name to be associated with the character recognition result in the storage table, the region comprises a frame of the field name and a frame of a field value where the characters to be set, the region is updated by correcting the frame of the field name and the frame of the field value to be an actual form having inline of the position and the size, the recognition result of the characters corresponding to the field value is set in the frame of the field value associated with the frame of the field name.

\* \* \* \* \*